March 10, 1964 J. SMITH 3,124,258
MEANS FOR PARKING VEHICLES
Filed Dec. 19, 1960 3 Sheets-Sheet 1
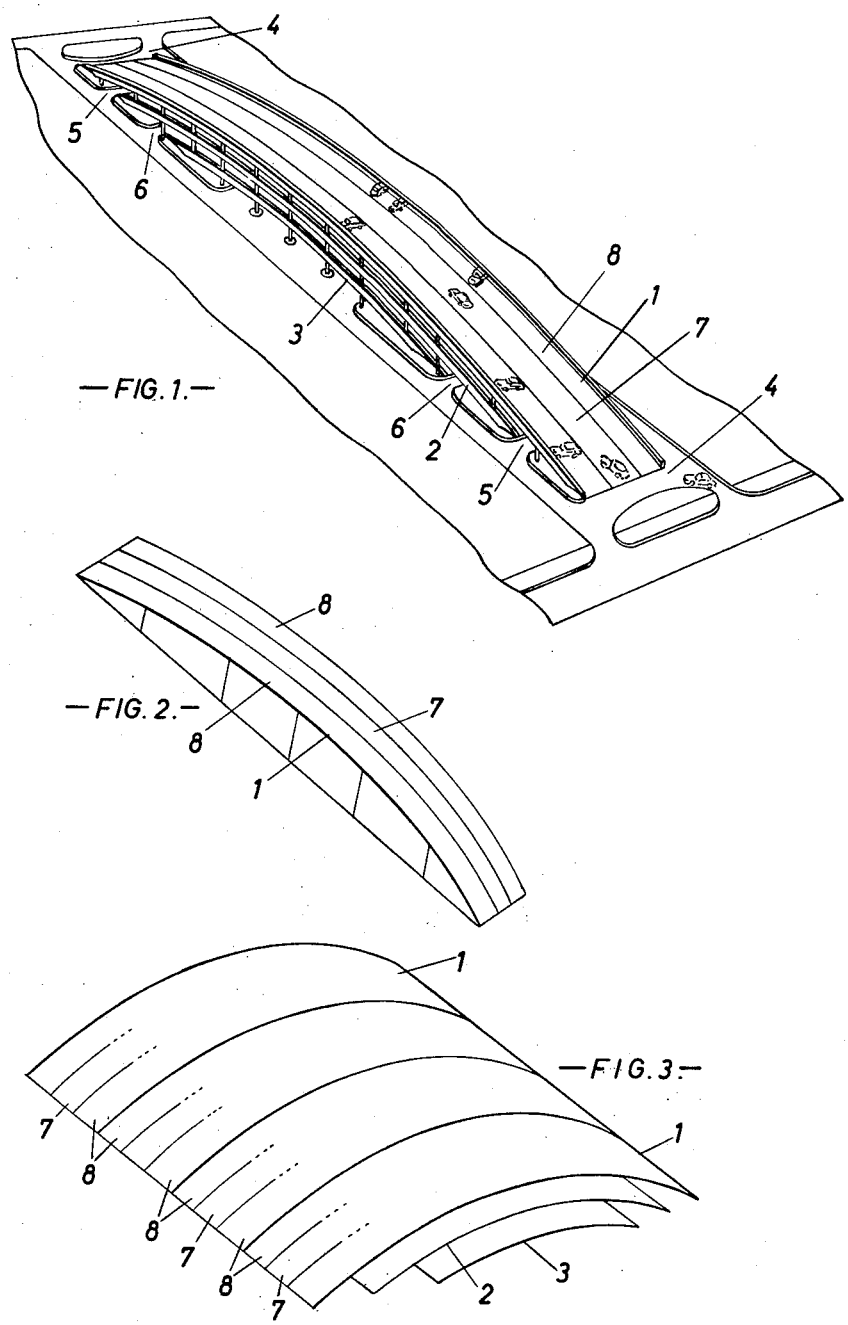

March 10, 1964  J. SMITH  3,124,258
MEANS FOR PARKING VEHICLES
Filed Dec. 19, 1960  3 Sheets-Sheet 2
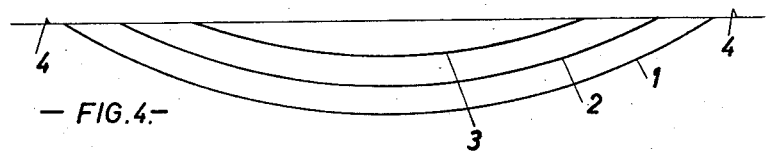
— FIG. 4.—
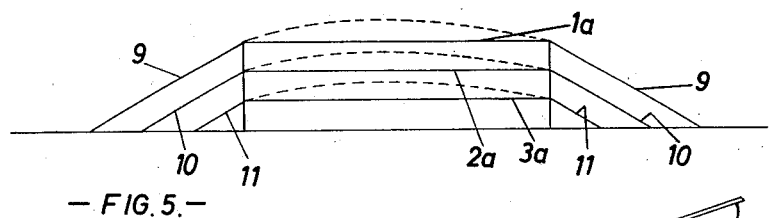
— FIG. 5.—
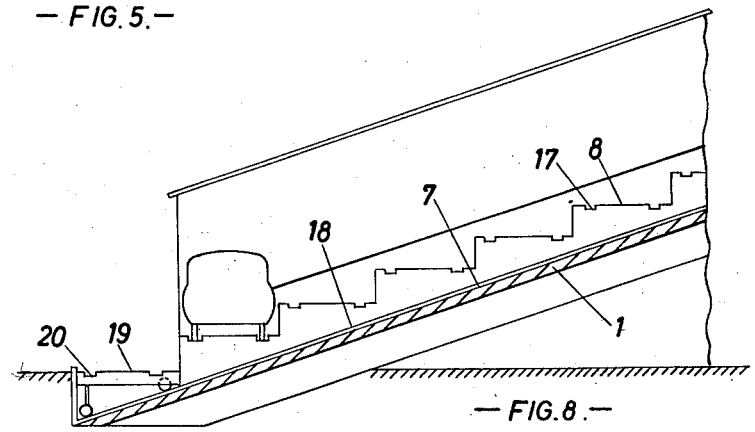
— FIG. 8.—
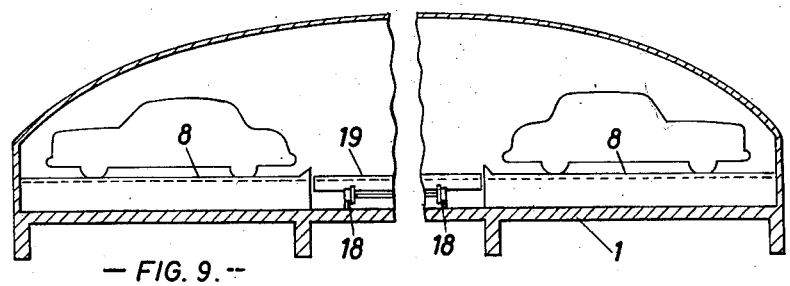
— FIG. 9.—

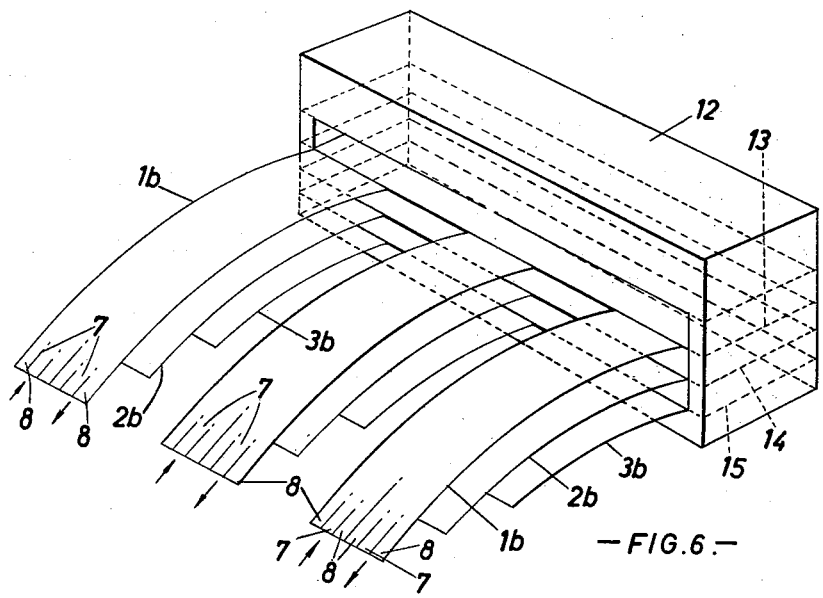
— FIG. 6. —
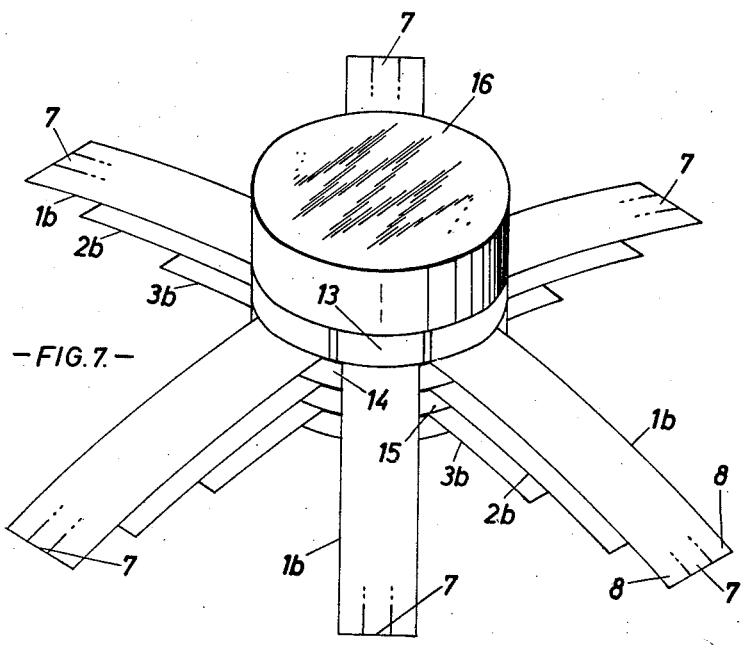
— FIG. 7. —

United States Patent Office 3,124,258
Patented Mar. 10, 1964

3,124,258
MEANS FOR PARKING VEHICLES
Jack Smith, Dewsbury, England, assignor to The Wheelwright Parking Company Limited, Dewsbury, England, a British company
Filed Dec. 19, 1960, Ser. No. 76,694
Claims priority, application Great Britain Dec. 24, 1959
11 Claims. (Cl. 214—16.1)

This invention relates to means for parking of road vehicles.

The parking of road vehicles, particularly cars, vans and the like, has become an acute problem, especially in towns and cities where space is restricted for this purpose. When vehicles are parked on one level a considerable area is required to hold what may be termed a large number of vehicles and in some cases new buildings are incorporating car-parking facilities, say in a basement or underground car park or on the roof of the building. It is also known to provide multi-level car parking in a building specially constructed for this purpose but ramps or lifts are provided for the different levels. One drawback to this arrangement is that a special building must be erected of considerable strength and often must be erected on a site which could be used for other purposes and in any case it is very costly to construct.

The main object of the present invention is to provide a parking system and means for parking vehicles.

Accordingly there is provided a parking system for road vehicles, including an arched structure, at least one end of the structure being at a level convenient for vehicles to pass thereonto at least one track running longitudinally of the structure to provide common passage means for vehicles, and vehicle parking bays extending laterally from the track on at least one side of the track.

The invention includes a parking structure for vehicles, comprising at least one complete or part arched structure with a longitudinal track lying adjacent and between a multiplicity of parking spaces disposed transversely of the structure. The parking spaces may be in the same plane as the track or on stepped levels. Means may be provided for conveying vehicles from at least one end of the structure along said track into register with a selected space into which the vehicle can be moved from the conveyor means.

The arched structure may be of multi-level construction. A number of single or multi-level structures may be located parallel or in other arrangement to one another. The conveyor means may be a wheeled bogie to receive a single vehicle with means for traversing it along the track.

The invention will now be more particularly described with reference to the accompanying drawings, in which:

FIG. 1 is a perspective view of a multi-arched structure for the parking of vehicles;

FIG. 2 is a diagrammatic isometric view of a single arch structure;

FIG. 3 is a diagrammatic isometric view of several multi-arch structures in close relationship;

FIG. 4 is a diagrammatic elevation illustrating an inverted multi-arched structure for underground vehicle parking;

FIG. 5 is a diagrammatic elevation illustrating a different form of multi-arch structure;

FIG. 6 is a diagrammatic isometric view of part multi-arched structures in association with a building structure;

FIG. 7 is a diagrammatic isometric view of part multi-arched structures radiating from a central building structure;

FIG. 8 is a sectional substantially diagrammatic part view of a modified parking structure with vehicle conveying means; and FIG. 9 is a cross-sectional view of FIG. 8.

FIG. 1 shows generally a vehicle parking structure comprising three superposed arches each having means for vehicles to be driven on to and off each arch for parking and removal purposes. The arches 1, 2 and 3 each in effect comprises a beam or rib of arch formation of substantially known concrete formation with the ends of each arch at ground level with an access road 4 at each end and inlet-outlet roads 5, 6 for the intermediate and lower arches 2, 3. A central longitudinal track 7 is shown on the upper arch with side spaces 8 for the provision of vehicle parking bays which may lie at a right- or other angle to the length of the track 7 and such bays may be designated by simple markings or raised constructions. Such spaces 8 may simply follow the line of the track, i.e. the same curvature as shown, or be of stepped formation to provide a level area for each vehicle. It will be understood that the other two arches 2 and 3 are similarly formed on their surface in having a track 7 and parking spaces 8. If so desired, a roof structure may be provided over the upper arch 1; such a structure can readily be provided on columns or posts, walls or other means and be of lightweight or other formation.

It will be appreciated that in certain instances a single arch such as is shown in FIG. 2 may be provided or a multiplicity of such single arches located in close juxtaposition or spaced side-by-side or other relationship.

As shown in FIG. 3 multi-arches of the type shown in FIG. 1 could be arranged in close juxtaposition or again these may be in spaced or other relationship.

As illustrated briefly in FIG. 4 a multi-arch structure can be inverted so as to provide a parking system below ground or other level as indicated.

FIG. 5 illustrates a multi-arch structure in a modified form wherein three superposed level arch parts 1a, 2a and 3a are provided with inclined ramp parts 9, 10 and 11. In such a construction vehicles may be parked solely on the level areas with the ramp portions used solely for placing vehicles into the parking bays, or alternatively vehicles may also be parked on such inclined ramps. Here again, a track will be furnished with laterally extending vehicle bays for each arch. As indicated, instead of the centre parts being flat they may be curved as indicated in dotted lines.

The parking system also includes the use of part-arch structures and FIG. 6 illustrates how arch sections of a multi-arch structure can be arranged in spaced relationship (they may be located close together) and have their upper ends tied to, or in relation to, a building structure 12, which can have floors 13, 14 and 15 co-operating with the arches 1b, 2b, 3b. Although each part-arch may have a single track 7 as before it is convenient to provide each part-arch with two tracks 7 and parking spaces 8 in conjunction, and vehicles can be driven up one track and parked anywhere therealong or driven into the building 12 and on to a floor 13, 14 or 15 for parking thereon and driven down the other track 7 on which parking of vehicles can occur. Such an arrangement facilitates the flow of traffic and provides an efficient system. It will be appreciated that any of the floors 13, 14 and 15 may be used solely for the parking of vehicles or say partly for some other purpose, whilst any remaining parts of the building may be used for offices or other purposes. It will be understood that although three-arch structures are shown only a single part-arch structure may be provided against the wall of a building, or two or more arches may be employed up to a reasonable maximum to suit building regulations. Also the parking structures may be located against more than one wall of the building and/or may be parallel with a wall or walls.

In FIG. 7 a further modified system is illustrated again using part-arch structures, in this case radiating from a central building 16 which can be employed in a similar manner to that described for the building 12.

In FIG. 8 an arrangement is shown wherein the parking areas 8 of an arch are of stepped formation and each step is shown with guide channels 17 for a vehicle although some other guide means or a simple level surface may be provided. In this instance the track 7 is furnished with rails 18 on which a wheeled bogie 19 is mounted and this can be operated in any known manner. The conveyor means may be provided for simple and multi-arch structures.

With this arrangement a vehicle can be driven on to the bogie and the latter traversed along the track until it is in register with a selected vacant bay when the vehicle can be moved manually or by other means from the conveying bogie into the parking bay, i.e. either forwardly or rearwardly. The bogie is furnished with guide channels 20 (or other means) to be aligned with the channels 17, and means may be furnished for preventing lengthwise movement of a vehicle on the bogie and/or the bays, such as removable or adjustable chocks or stops.

With the above arrangements vehicles can be parked and removed from one end of an arch or both ends of the arch utilized according to its design. If desired, any of the structures may have a roof covering and retaining walls can be furnished along the length of the arched structure. Single arch or multi-level complete or part arch constructions for the parking of vehicles may be located in selected positions on level or other ground or areas and may be located in positions hitherto not available or convenient for the parking of vehicles. They can readily be arranged in relation to or over roadways, streets or other thoroughfares, traffic roundabouts, rivers and even buildings without being a part thereof, although they could become a feature thereof as indicated, whilst being self-supporting. Moreover, a number of the parking structures can be combined in parallel arrangement as shown in which case, if desired, they may have buildings between them and such buildings may even be an integral feature of the parking structures linking them together. The structures may be of different arrangement, say crossing one another. When desirable at least one through way for pedestrians may be included.

A parking structure, or structures, according to this invention may incorporate or be associated with a flight deck, or decks and/or landing area or areas for aircraft.

Although concrete has been referred to for the construction of the parking system structures and may be in preformed sections and/or units, it will be understood that other materials may also be used for this sort of constructional work and that a combination of materials may be employed. Moreover, an arch or part-arch structure may have a single track for the common passage of vehicles with the parking bays all on one side of the track, or two common passage tracks may be provided at the sides of a central parking area. Any of the constructions may include means such as footways, steps, ramps, lifts, or the like for pedestrians which of course includes persons passing to or from parked vehicles.

What I claim is:

1. A parking system for road vehicles, including a multi-arched structure with the arches in superposed relation, at least one end of each arch being at ground level for vehicles to pass thereonto, at least one track running longitudinally of each arch to provide common passage means for vehicles, and vehicle parking bays extending laterally from the track on at least one side of the track.

2. A parking system according to claim 1, wherein the arched structure is of complete arch formation.

3. A parking system according to claim 1, wherein the arched structure is of part-arch formation.

4. A parking system according to claim 1, wherein the arched structure is of elevated construction.

5. A parking system according to claim 1, wherein the arched structure is of inverted construction.

6. A parking system according to claim 1 wherein a number of arched structures are combined in one plane.

7. A parking system according to claim 1, wherein vehicles require to be moved over the track into and out of parking bays under their own power.

8. A parking system according to claim 1, wherein the track forming passage means include means for conveying vehicles to and away from a parking bay.

9. A parking system according to claim 1, wherein each arch has a central longitudinal track and parking bays extending laterally on each side thereof.

10. A parking system according to claim 1, in combination with at least one building structure.

11. A parking system according to claim 1, wherein the arched structure is combined with a building to extend from at least one wall thereof, the construction being such that vehicles can enter and be parked in said building in addition to parking on each arch.

References Cited in the file of this patent

UNITED STATES PATENTS

| 773,729   | Geisel    | Nov. 1, 1904  |
| 1,749,324 | Craig     | Mar. 4, 1930  |
| 1,784,728 | Harriss   | Dec. 9, 1930  |
| 1,808,741 | Alt       | June 9, 1931  |
| 1,998,290 | Schraeder | Apr. 16, 1935 |

FOREIGN PATENTS

| 564,329 | Canada | Oct. 7, 1958 |

OTHER REFERENCES

Engineering News-Record, Apr. 12, 1937, pp. 259–261.